(12) United States Patent
Tiesler et al.

(10) Patent No.: US 7,104,915 B2
(45) Date of Patent: Sep. 12, 2006

(54) MULTIPLE GEAR STAGE AUTOMATIC TRANSMISSION

(75) Inventors: Peter Tiesler, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 167 days.

(21) Appl. No.: 10/934,184

(22) Filed: Sep. 3, 2004

(65) Prior Publication Data

US 2005/0054476 A1    Mar. 10, 2005

(30) Foreign Application Priority Data

Sep. 4, 2003    (DE) ................. 103 40 731

(51) Int. Cl.
*F16H 3/62*    (2006.01)
(52) U.S. Cl. ................... 475/286; 475/275
(58) Field of Classification Search ............. 475/275, 475/276, 277, 278, 279, 280, 286, 287, 296
See application file for complete search history.

(56) References Cited

U.S. PATENT DOCUMENTS

| | | |
|---|---|---|
| 3,776,066 A | 12/1973 | Piret |
| 3,977,272 A | 8/1976 | Neumann |
| 4,070,927 A | 1/1978 | Polak |
| 4,395,925 A | 8/1983 | Gaus |
| 4,732,253 A | 3/1988 | Hiramatsu et al. |
| 4,939,955 A | 7/1990 | Sugano |
| 5,106,352 A | 4/1992 | Lepelletier |
| 5,232,411 A | 8/1993 | Hayashi et al. |
| 5,250,011 A | 10/1993 | Pierce |
| 5,295,924 A | 3/1994 | Beim |
| 5,308,295 A | 5/1994 | Michioka et al. |
| 5,435,792 A | 7/1995 | Justice et al. |
| 5,439,088 A | 8/1995 | Michioka et al. |
| 5,460,579 A | 10/1995 | Kappel et al. |
| 5,520,588 A | 5/1996 | Hall, III |
| 5,533,945 A | 7/1996 | Martin et al. |
| 5,536,220 A | 7/1996 | Martin |
| 5,542,889 A | 8/1996 | Pierce et al. |
| 5,647,816 A | 7/1997 | Michioka et al. |
| 5,735,376 A | 4/1998 | Moroto et al. |
| 6,139,463 A | 10/2000 | Kasuya et al. |

(Continued)

FOREIGN PATENT DOCUMENTS

DE    26 19 895    11/1976

(Continued)

*Primary Examiner*—Ha Ho
(74) *Attorney, Agent, or Firm*—Davis & Bujold, P.L.L.C.

(57) ABSTRACT

A multiple stage transmission comprises three planetary gear sets (P1, P2, P3), at least six rotatable shafts (1, 2, 3, 4, 5, 6), brakes (03, 04) and clutches (13, 15, 46, 56), the drive shaft (1) being permanently connectable with the ring gear of the first planetary gear set (P1) and via one clutch (15) with the shaft (5) which is connected with the sun gear of the second planetary gear set (P2) and the sun gear of the third planetary gear set (P3) and via the clutch (56) connectable with the shaft (6), the driven shaft (2) being connected with the spider of the third planetary gear set (P3) and the ring gear of the second planetary gear set (P2), the shaft (3) being permanently connected with the ring gear of the third planetary gear set (P3), via one clutch (13) connectable with the drive shaft (1) and via one brake (03) attachable to the housing (G) and the sun gear of the first planetary gear set (P1) being non-rotatably connected via one shaft (0) with the housing (G).

29 Claims, 2 Drawing Sheets

U.S. PATENT DOCUMENTS

| | | |
|---|---|---|
| 6,471,616 B1 | 10/2002 | Stevenson |
| 6,514,170 B1 * | 2/2003 | Kao et al. .................. 475/296 |
| 6,558,287 B1 | 5/2003 | Hayabuchi et al. |
| 6,572,507 B1 | 6/2003 | Korkmaz et al. |
| 6,634,980 B1 | 10/2003 | Ziemer |
| 6,709,358 B1 * | 3/2004 | Raghavan et al. .......... 475/275 |
| 6,723,018 B1 | 4/2004 | Hayabuchi et al. |
| 6,910,985 B1 * | 6/2005 | Ishimaru et al. ............ 475/275 |
| 2002/0091032 A1 | 7/2002 | Hayabuchi et al. |
| 2002/0183160 A1 | 12/2002 | Kao et al. |
| 2003/0060322 A1 | 3/2003 | Raghavan et al. |
| 2003/0083174 A1 | 5/2003 | Tabata et al. |
| 2003/0119623 A1 | 6/2003 | Stevenson et al. |
| 2003/0162625 A1 | 8/2003 | Raghavan et al. |
| 2004/0092357 A1 | 5/2004 | Biermann |
| 2004/0097324 A1 | 5/2004 | Ziemer |
| 2004/0116238 A1 | 6/2004 | Ziemer |

FOREIGN PATENT DOCUMENTS

| | | |
|---|---|---|
| DE | 27 21 719 | 12/1977 |
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 43 32 466 A1 | 3/1995 |
| DE | 195 24 698 A1 | 2/1996 |
| DE | 197 02 198 A1 | 7/1998 |
| DE | 198 33 376 A1 | 12/1999 |
| DE | 199 12 480 A1 | 9/2000 |
| DE | 199 12 481 A1 | 9/2000 |
| DE | 199 49 507 A1 | 4/2001 |
| DE | 102 00 379 A1 | 8/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| DE | 102004040904 * | 3/2006 |
| EP | 0 434 525 A1 | 6/1991 |
| EP | 0 605 953 A1 | 7/1994 |
| EP | 0 719 961 A2 | 7/1996 |
| EP | 1 265 006 A2 | 12/2002 |
| JP | 04290649 | 10/1992 |
| JP | 08200456 | 8/1996 |
| JP | 10259861 A | 9/1998 |
| JP | 2000240741 | 9/2000 |
| JP | 2001082555 | 3/2001 |
| JP | 2002323098 | 11/2002 |
| JP | 2004-347075 * | 12/2004 |
| WO | WO-96/01381 | 1/1996 |

* cited by examiner

Variation 1:

| Grading | 1.61 | 1.55 | 1.44 | 1.21 | 1.26 | 1.17 | 1.1 | Spread | 7 | -3.5 |
|---|---|---|---|---|---|---|---|---|---|---|
| i-Gear | 7 | 4.35 | 2.8 | 1.94 | 1.61 | 1.28 | 1.1 | 1 | -5.62 | R2 |
| SE\Gg | 1 | 2 | 3 | 4 | 5 | 6 | 7 | 8 | R1 | |
| 03 | x | x | | | | | | | | | |
| 04 | | | x | | | | | | | x | x |
| 13 | | x | | x | | x | x | x | | | |
| 15 | | | | x | x | x | | x | | x | x |
| 46 | | | x | x | x | x | x | | | | |
| 56 (IAK) | x | | | | | | | x | | x | |

Fig. 3

Variation 2:

| Grading | 1.67 | 1.47 | 1.38 | 1.24 | 1.28 | 1.18 | 1.11 | Spread | 7 | -5.62 |
|---|---|---|---|---|---|---|---|---|---|---|
| i-Gear | 7 | 4.18 | 2.85 | 2.07 | 1.67 | 1.31 | 1.11 | 1 | -3.5 | R1 |
| SE\Gg | 1 | 2 | 3 | 4 | 5 | 6 | 7 | 8 | R2 | |
| 03 | x | x | | | | | | | | | |
| 04 | | | x | | | | | | | x | |
| 13 | | x | | x | | x | x | x | | | |
| 15 | | | | x | x | x | | x | | x | |
| 46 | | | x | x | x | x | x | | | | |
| 56 | x | | | | | | | x | | | x |

Fig. 4

MULTIPLE GEAR STAGE AUTOMATIC TRANSMISSION

This application claims priority from German Application Serial No. 103 40 731.6 filed Sep. 4, 2004.

FIELD OF THE INVENTION

The invention concerns a multiple stage transmission, particularly an automatic transmission for a motor vehicle.

BACKGROUND OF THE INVENTION

In the prior art, automatic transmission, particularly for motor vehicles, comprise planetary gear sets shifted by means of friction and shifting elements such as clutches and brakes and usually have one starting element, such as a hydrodynamic converter or a fluid clutch, optionally provided with a lock-up clutch and subject to a slip effect.

Such a transmission results from EP 0 434 525 A1. It essentially comprises one drive shaft and one driven shaft disposed parallel with each other, one double planetary gear set disposed concentrically with the driven shaft and five shifting elements in the form of three clutches and two brakes, the optional locking of which by pairs determines the different gear ratios between the drive shaft and the driven shaft. This transmission has a front-mounted range change set and two power paths so that six forward gears are obtained by selective engagement by pairs of the five shifting elements.

Here two clutches are needed in the first power path for transmitting the torque from the front-mounted range change set to two elements of the double planetary gear set. These are situated in the power flow direction essential downstream of the front-mounted range change set in the direction of the double planetary gear set. In the second power path, one other clutch is provided which loosely connects it with another element of the double planetary gear set. The clutches are arranged here so that the internal disc carrier constitutes the output.

In addition, the U.S. Pat. No. 6,139,463 publication has disclosed a compact multiple stage transmission of a planetary design, particularly for motor vehicles, which has two planetary gear sets and one front-mounted range change set, the same as three clutches and two brakes. In this known multiple stage transmission, two clutches C-1 and C-3 are provided in a first power path for transmitting the torque from the front-mounted range change set to the two planetary gear sets. The external disc carrier or the cylinder or piston and pressure compensation side of the clutch C-3 is here connected with a first brake B-1. Besides, the internal disc carrier of the third clutch C-3 is connected with the cylinder or piston and pressure compensation side of the first clutch C-1, the internal disc carrier of the first clutch C-1 is located on the output side and connected with a sun gear of the third planetary gear set.

From the Applicant's DE 199 49 507 A1 is further known a multiple stage transmission where two non-shiftable front-mounted range change sets are provided on the drive shaft which, on the output side, produce two rotational speeds which, together with the rotational speed of the drive shaft, are optionally shiftable by selective engaging of the used shifting elements, to a shiftable double planetary gear set acting upon the driven shaft in a manner such that to change over from one gear to the next sequential higher or lower gear of the two specifically actuated shifting elements, respectively, only one shifting element has to be engaged or disengaged.

From DE 199 12 480 A1 is known an automatically shiftable motor vehicle transmission having three spider planetary gear sets, the same as three brakes and two clutches, for shifting six forward gears and one reverse gear and having one drive shaft and one driven shaft. The automatically shiftable motor vehicle transmission is designed so that the drive shaft is directly connected with the sun gear of the second planetary gear set and the drive shaft is connectable, via the first clutch, with the sun gear of the first planetary gear set and/or via the second clutch with the spider of the first planetary gear set. Additionally or alternatively, the sun gear of the first planetary gear set is connectable, via the first brake, with the housing of the transmission and/or the spider of the first planetary gear set with the housing, via the second brake, and/or the sun gear of the third planetary gear set with the housing via the third brake.

DE 102 13 820 A1 has also disclosed a multiple stage automatic transmission comprising one first input path T1 of a first reduction ratio; one input path T2 which has a higher reduction ratio than said input path T1; one planetary gear set having four elements, said four elements being one first element, one second element, one third element and one fourth element in the sequence of elements in a rotational speed diagram; one clutch C-2 which transmits rotation of the input path T2 to the first element S3; and clutch C-1 which transmits the rotation from the input path T2 to the fourth element S2; one clutch C-4 which transmits rotation from the input path T1 to the first element; one clutch C-3 which transmits rotation from the input path T1 to the second element C-3; one brake B-1 which creates engagement of the fourth element; one brake B-2 which creates engagement of the second element; and one output element coupled with the third element R3.

With the scope of the Applicant's DE 101 15 983 A1 is described a multiple stage transmission having one drive shaft connected with a front-mounted range change set, one driven shaft connected with a rear-mounted range change set and having a maximum of seven shifting elements by the optional shifting of which at least seven forward gears can be shifting without group shift. The front-mounted range change set is formed by a front-mounted planetary gear set or a maximum of two non-shiftable front-mounted planetary gear sets coupled with the front-mounted planetary gear set, the rear-mounted range change set is designed as a two-spider-four shaft transmission with two shiftable rear-mounted range change sets and four free shafts. The first free shaft of said two-spider-four shaft transmission is connected with the first shifting element, the second free shaft with the second and third shifting elements, the third free shaft with the fourth and fifth shifting elements and the fourth free shaft is connected with the driven shaft. For a multiple stage transmission with a total of six shifting elements, the invention additionally proposes to connect the third free shaft or the first free shaft of the rear-mounted range change set with a sixth shifting element. For a multiple stage transmission having a total of seven shifting elements, the invention proposes connecting the third free shaft additionally with a shift shifting element D' and the first free shaft additionally with a seventh shifting element.

Within the scope of the Applicant's DE 101 15 987 has been described a multiple stage transmission having at least seven gears. Said transmission, together with the drive shaft and the driven shaft, comprises one non-shiftable front-mounted range change set and one shiftable rear-mounted range change set in the form of a two-spider-four shaft transmission. The front-mounted range change set comprises one first planetary gear set which, together with the input rotational speed of the drive shaft, offers a second rotational speed which can optionally be shifted to a rear-mounted range change set. The rear-mounted range change set consists of two shiftable planetary gear sets which, with the six shifting elements, can shift at least seven gears, with two power paths being formed. At the same time, group shifts are always advantageously prevented during each shifting operation. One 9-gear multiple stage transmission has further become known from DE 29 36 969; it comprises eight shifting elements and four gear sets.

Automatically shiftable vehicle transmissions of a planetary design have already generally been widely described in the prior art and are subject to permanent developments and improvement. Said transmissions thus must have a sufficient number of forward gears, the same as one reverse gear and a ratio very well suited for motor vehicles with a high total spread and favorable ratio ranges. They must also make possible a high starting ratio in a forward direction and contain a direct gear, the same is adequate for use both in passenger and in commercial vehicles. In addition, said transmission must have low construction cost, especially require a low number of shifting elements and prevent double shifts in a sequential shifting mode so that in case of shiftings in defined gear groups only one shifting element is changed.

The problem on which this invention is based is to propose a multiple stage transmission of the type mentioned above in which the construction cost is optimized and, in addition, the efficiency degree is improved in the main drive gears with regard to towing and gearing losses. Besides, on the shifting elements and planetary gear sets, low torques must act in the inventive multiple stage transmission, the same as the rotational speeds of the shafts; shifting elements and planetary gear sets are to be kept as low as possible. The number of gears, the same as the transmission spread must also be increased so that seven or eight forward gears and at least one reverse gear can be advantageously implemented. Besides, the inventive transmission must be adequate for any design of the vehicle, especially for a front-transverse arrangement.

SUMMARY OF THE INVENTION

A multiple stage transmission in planetary design is accordingly proposed which has one drive shaft and one driven shaft located in one housing. In addition, at least three planetary gear sets, at least six rotatable shafts, the same as at least six shifting elements including two brakes and four clutches are provided, the selective engagement of which by pairs produces different reduction ratios between the drive shaft and the driven shaft so that preferably eight forward gears and at least one reverse gear can be implemented.

The drive shaft is permanently connectable with the ring gear of the first planetary gear set and via one clutch with one fifth shaft which is connected with the sun gear of the second planetary gear set and with the sun gear of the third planetary gear set and via one other clutch with a sixth shaft, said shaft being connected on one side with the spider of the first planetary gear set and on the other side loosely connectable via one other clutch with a fourth shaft which is permanently connected with the spider of the second planetary gear set and via one brake attachable to the housing. In addition, the driven shaft is inventively connected with the spider of the third planetary gear set and with the ring gear of the second planetary gear set, one third shaft being permanently connected with the ring gear of the third planetary gear set, via one other clutch loosely connectable with the drive shaft and via one brake attachable to the housing and the sun gear of the first planetary gear set being non-rotatably connected with the housing via one shaft.

By the inventive configuration of the multiple stage transmission, particularly for passenger motor vehicles, suitable ratios and a considerable increase in the total spread of the multiple stage transmission results whereby an improvement in driving comfort and a significant reduction in consumption are produced.

With the inventive multiple stage transmission, the construction cost is furthermore considerably reduced due to a small number of shifting elements, preferably two brakes and four clutches. It is advantageously possible with the inventive multiple stage transmission, to start off with a hydrodynamic converter, an external starting clutch or with any other suitable external starting element. It is also conceivable to have a starting off operation with one starting element integrated in the transmission. Preferably suitable is a shifting element actuated in the first forward gear and in the first reverse gear.

With the inventive multiple stage transmission, a good degree of efficiency in the main drive gears relative to towing and gearing losses further results.

Besides, torque in the shifting elements and in the planetary gear sets of the multiple stage transmission is low whereby the wear is advantageously reduced in the multiple stage transmission. The low torque also makes correspondingly small dimensions possible whereby the installation space needed and the attendant costs are reduced. In addition, the rotational speeds are also low for the shafts, the shifting elements and the planetary gear sets.

The inventive transmission is furthermore designed so that an adaptability to different drive line configurations is possible both in power flow direction and with regard to space.

BRIEF DESCRIPTION OF THE DRAWINGS

The invention will now be described, by way of example, with reference to the accompanying drawings in which:

FIG. 3 shows a configuration diagram by way of example for the inventive multiple stage transmission according to FIGS. 1 and 2; and FIG. 4 shows another configuration diagram by way of example for the inventive multiple stage transmission according to FIGS. 1 and 2.

DETAILED DESCRIPTION OF THE INVENTION

Figure 1:
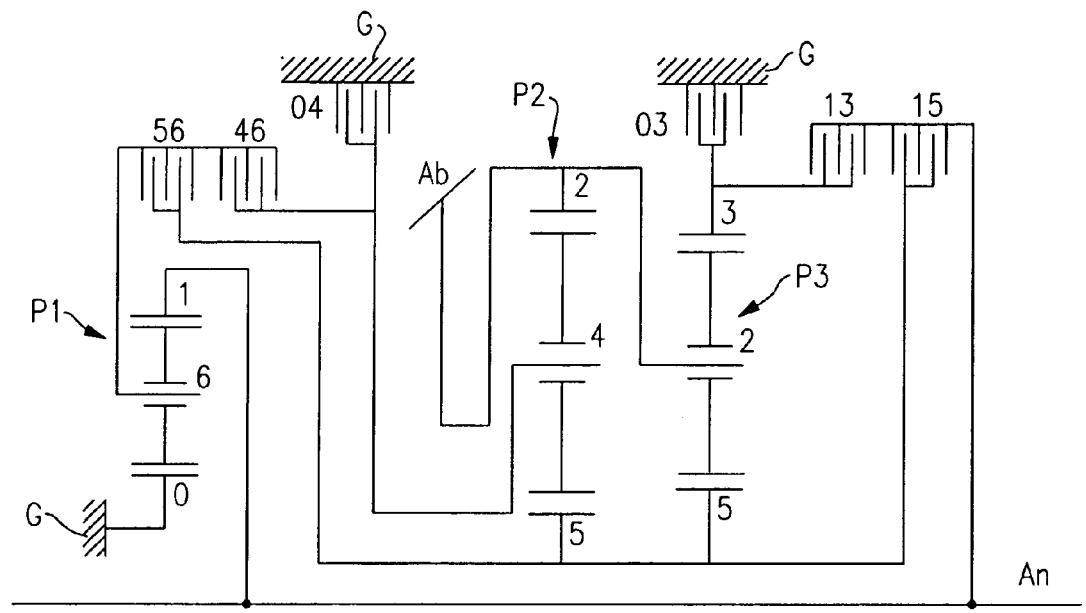
FIG. 1 is a diagrammatic view of a preferred embodiment of the inventive multiple stage transmission adequate for a front-transverse design.

In FIG. 1, an inventive multiple stage transmission is shown having one drive shaft 1 (An) and one driven shaft 2 (Ab) located in one housing G. Three planetary gear sets P1, P2, P3 are provided. The planetary gear sets P1, P2, P3 are preferably designed as minus planetary gear sets; the first planetary gear set serves as a front-mounted range change set and the planetary gear sets P2, P3 are coupled with each other.

As can be seen from FIG. 1, only six shifting elements are provided, namely, two brakes 03, 04. e.g., first brake 03 and second brake 04, and four clutches 13, 15, 46 and 56. e.g., first clutch 13, second clutch 15, third clutch 46 and fourth clutch 56.

With said shifting elements, a selective shifting of seven or eight forward gears and preferably two reverse gears can be implemented by engagement of two shift elements. The inventive multiple stage transmission has a total of six rotatable shafts, namely, the drive shaft, the driven shaft, a third shaft, a fourth shaft, a fifth shaft and a sixth shaft 1, 2, 3, 4, 5, 6.

In the multiple stage transmission according to FIG. 1, the invention provides that the input takes place by the shaft 1 which is permanently connected with the ring gear of the first planetary gear set P1 and connectable, via one clutch 15, with the shaft 5 which is connected with the sun gear of the second planetary gear set P2 and the sun gear of the third planetary gear set P3 and connectable via the clutch 56 with the shaft 6 which, on one side, is connected with the spider of the first planetary gear set P1 and, on the other side, via one clutch 46, loosely connectable with one shaft 4 which is permanently connected with the spider of the second planetary gear set P2. In addition, the shaft 4 is attachable to the housing G, via one brake 04, preferably in an area between the spider of the second planetary gear set P2 and the brake 04. The clutches 56 and 46 are preferably disposed side by side. Within the scope of a preferred embodiment, they have a common external disc carrier situated on the input side. The clutch 46 is preferably situated in power flow direction after the clutch 56.

The drive shaft 1 is also loosely connectable via one clutch 13 with the shaft 3 which is attachable to the housing G via one brake 03 and is connected with the ring gear of the third planetary gear set P3. The clutches 13 and 15 are, likewise, preferably disposed side by side and can have one common external disc carrier which is situated on the input side. The clutch 13 is preferably arranged in power flow direction after the clutch 15.

The output takes place, according to the invention, via the shaft 2 which is connected with the spider of the third planetary gear set P3 and with the ring gear of the second planetary gear set. Besides, the sun gear of the first planetary gear set is non-rotatably connected with the housing G via one shaft 0.

The spatial arrangement of the shift elements can be arbitrary and limited only by the dimensions and the outer molding. As is to be determined from FIGS. 1 and 2, the clutches 56, 46, 13, 15, radially observed, are preferably situated approximately above the planetary gear sets; with other arrangements being also possible.

Figure 2:
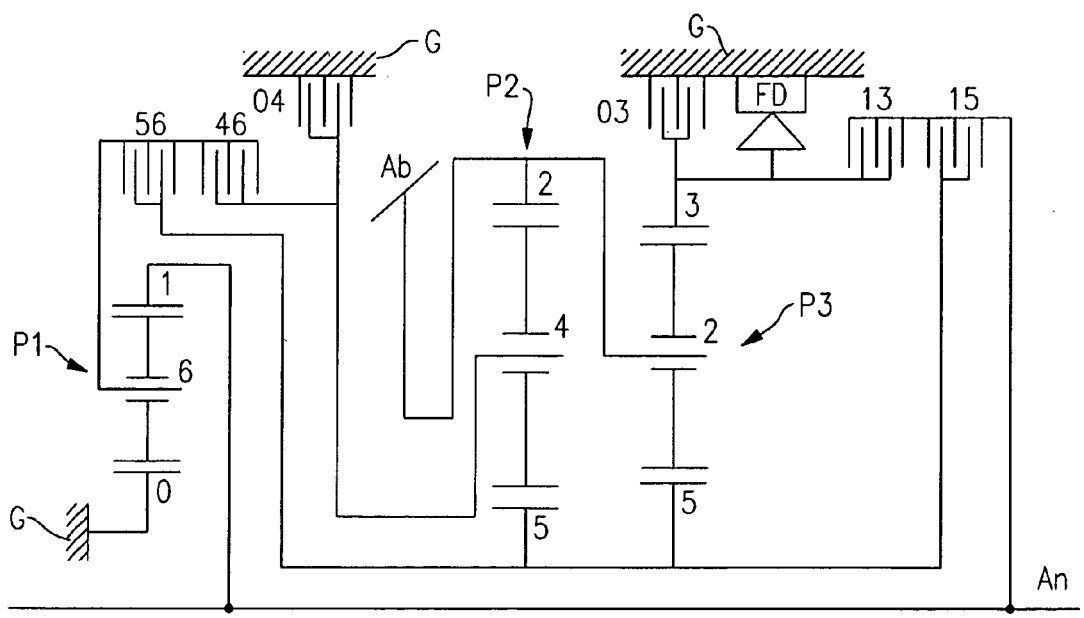
FIG. 2 is a diagrammatic view of a preferred embodiment of an inventive multiple stage transmission having one freewheel.

The embodiment, according to FIG. 2, differs from the embodiment, according to FIG. 1, in that one freewheel FD is provided parallel with the brake 03. Thereby the high supporting torques can be reduced.

In FIG. 3, a configuration diagram of the inventive multiple stage transmission, according to FIGS. 1 and 2, is shown by way of example. For each gear, two shifting elements are engaged. From the configuration diagram, the respective ratios i of the individual gear steps and the ratio ranges to be determined therefrom can be determined by way of example. It can also be determined from the configuration diagram that, during the sequential shifting mode, double shifts or group shifts are prevented, since two adjacent gear steps use one shifting element in common. As can be seen from the configuration diagram, it is also possible to skip over gears without a group shift. The eighth gear is preferably designed as a direct gear, the ratio ranges in the upper gears being small. This configuration diagram is especially suited to passenger vehicles. The transmission can also be designed as a seven-gear transmission when the seventh gear falls so that the ratio steps 1.28 and 1.1 are combined.

For the first three gears, the brake 03 is always engaged. In addition, the clutch 56 is engaged for the first gear; the clutch 15 for the second gear and the clutch 46 for the third gear. The clutch 46 is always engaged for the gears four, five and six. In addition, the clutch 15 is engaged for the fourth gear, for the fifth gear the clutch 56 and for the sixth gear the clutch 13. The seventh gear results by engaging the clutches 13 and 56 and the eighth gear by engaging the clutches 13 and 15. For the first reverse gear the brake 04 and the clutch 56 are engaged and for the second reverse gear the brake 04 and the clutch 15.

According to the invention it is possible to start off with an integrated shifting element (IAK). The clutch 56 is especially suitable here since in the first gear and in the first reverse gear it is required without a change in direction of rotation. The high ratio of the first reverse gear results in a good switchability; a change between the reverse gears can also result without group shifting which is advantageous, for example, for safety vehicles. In order that the brake 04 does not have to have large dimensions, a torque reduction greater than in the second reverse gear is important for the first reverse gear.

According to the invention in the same transmission diagram, depending on shifting logic, different ratio steps can result so that a variation in application and specific to the vehicle is possible.

In FIG. 4 is shown another configuration diagram. It differs from the configuration diagram of FIG. 3 in that the gear steps assume different values.

It is also possible on each suitable place of the multiple stage transmission to provide additional freewheels, for example, between one shaft and the housing or in order optionally to connect two shafts.

According to the invention one axle differential and/or one transfer differential can be situated on the input side or on the output side.

Within the scope of an advantageous development, the drive shaft 1 can be separated as needed from a prime mover PM by one clutch element CE, it being possible to use as clutch element a hydrodynamic converter, a hydraulic clutch, a dry starting clutch, a wet starting clutch, a magnetic powder clutch, or a centrifugal clutch. It is also possible to situate such a starting element in power flow direction after the transmission in which case the drive shaft 1 is permanently connected with the crankshaft of the motor.

The inventive multiple stage transmission besides makes possible placing one torsional vibration damper between the motor and the transmission.

Within the scope of another embodiment of the invention, not shown, it is possible to situate a wear-free brake, such as a hydraulic or electric retarder or the like, upon each shaft, preferably upon the drive shaft 1 or the driven shaft 2, which is especially important for use in commercial vehicles. It is also possible to provide one power take-off on each shaft, preferably on the drive shaft 1 or the driven shaft 2 for driving additional units.

The used shifting elements can be designed as power shifting clutches or brakes. Especially force-locking clutches or brakes like multi-disc clutches, band brakes and/or tapered clutches can be used. Besides, form-locking brakes and/or clutches, such as synchronizers or dog clutches, can also be used as the shifting elements.

Another advantage of the multiple stage transmission introduced here is that an electric machine can be mounted upon each shaft as generator and/or as an additional prime mover, upon each shaft.

Every constructional design, especially every spatial arrangement of the planetary gear sets and of the shifting elements per se the same as relative to each other and insofar as technically convenient, obviously falls under the scope of protection of the instant claims without affecting the operation of the transmission such as indicated in the claims even if said designs are not explicitly shown in the Figures or in the description.

REFERENCE NUMERALS 0 shaft
1 shaft
2 shaft
3 shaft
4 shaft
5 shaft
6 shaft
03 brake
04 brake
13 clutch
15 clutch
45 clutch
56 clutch
P1 planetary gear set
P2 planetary gear set
P3 planetary gear set
An drive
Ab drive
i ratio
G housing
FD freewheel

The invention claimed is:

1. A multiple stage transmission of a planetary design, for an automatic motor vehicle, comprising a housing (g) accommodating a drive shaft (1) and a driven shaft (2), first second and third planetary gear sets (P1, P2, P3), at least a third shaft, a fourth shaft, a fifth shaft and a sixth shaft (1, 2, 3, 4, 5, 6), at least six shifting elements (03, 04, 13, 15, 46, 56) including first and second brakes (03, 04) and first, second, third and fourth clutches (13, 15, 46, 56) which are selectively engageable for producing different reduction ratios between the drive shaft (1) and the driven shaft (2) so that the multiple stage transmission is able to implement either seven or eight forward gears and at least one reverse gear;

the drive shaft (1) being permanently connected with a ring gear of the first planetary gear set (P1) and connectable, via the second clutch (15), with the fifth shaft (5), which is connected with a sun gear of the second planetary gear set (P2) and with a sun gear of the third planetary gear set (P3) and connectable, via the fourth clutch (56), with the sixth shaft (6); the sixth shaft (6), on a first side, being connected with a spider of the first planetary gear set (P1) and, on another side, being connectable via the third clutch (46) with the fourth shaft (4) which is permanently connected with a spider of the second planetary gear set (p2) and attachable to the housing (G) via the second brake (04), the driven shaft (2) being connected with a spider of the third planetary gear set (P3) and a ring gear of the second planetary gear set (P2), the third shaft (3) being permanently connected with a ring gear of the third planetary gear set (P3), via the first clutch (13), connectable with the drive shaft (1) and attachable to the housing (G) via the first brake (03), a sun gear of the first planetary gear set (P1) being non-rotatably connected with the housing (G) via one additional shaft (0).

2. The multiple stage transmission according to claim 1, wherein the seven or eight forward gears are shiftable so that during a gear change from one forward gear to one of the next sequentially higher and a next sequentially lower forward gear, only one previously engaged shifting element is disengaged and only one previously unengaged shifting element is engaged.

3. The multiple stage transmission according to claim 1, wherein two respective shifting elements are engaged for each one of the seven or eight forward gears and for the reverse gear.

4. The multiple stage transmission according to claim 1, wherein the multiple stage transmission has eight forward gears and the first brake and the fourth clutch (03, 56) are engaged for a first forward gear, the first brake and the second clutch (03, 15) are engaged for a second forward gear, the first brake and the third clutch (03, 46) are engaged for a third forward gear, the second clutch and the third clutch (15, 46) are engaged for a fourth forward gear, the third clutch and the fourth clutch (46, 56) are engaged for a fifth forward gear, the first clutch and the third clutch (13, 46) are engaged for a sixth forward gear, the first clutch and the fourth clutch (13, 56) are engaged for a seventh forward gear, and the first clutch and the second clutch (13, 15) are engaged for an eighth forward gear.

5. The multiple stage transmission according to claim 1, wherein the multiple stage transmission has two reverse gears.

6. The multiple stage transmission according to claim 5, wherein during a gear change from one of the two reverse gears to the other of the two reverse gears only one previously engaged shifting element is disengaged and one previously unengaged shifting element is engaged.

7. The multiple stage transmission according to claim 1, wherein the second brake (04) and one of the second and fourth clutches (15, 56) are engaged for the reverse gear.

8. The multiple stage transmission according to claim 1, wherein at least one of the first and second clutches (13, 15) and one of the third and fourth clutches (46, 56) are respectively disposed side by side.

9. The multiple stage transmission according to claim 1, wherein at least one of the first and second clutches (13, 15) and one of the third and fourth clutches (46, 56) respectively have a common external disc carrier.

10. The multiple stage transmission according to claim 9, wherein the external disc carrier of the at least one of the first and second clutches (13, 15) and the external disc carrier of the one of the third and fourth clutches (46, 56) are disposed on an input side of the transmission.

11. The multiple stage transmission according to claim 1, wherein the first, second and third planetary gear sets (P1, P2, P3) are each a minus planetary gear set.

12. The multiple stage transmission according to claim 1, wherein an additional freewheel is located within the multiple stage transmission.

13. The multiple stage transmission according to claim 1, wherein at least one freewheel is provided between one of the drive shaft, the driven shaft, the third shaft, the fourth shaft, the fifth shaft and the sixth shaft (1, 2, 3, 4, 5, 6) and the housing (G).

14. The multiple stage transmission according to claim 1, wherein an input side and an output side of the multiple stage transmission are provided on the same side of the housing (G).

15. The multiple stage transmission according to claim 1, wherein at least one of an axle and a transfer differential is provided upon one of an input side and an output side of the multiple stage transmission.

16. The multiple stage transmission according to claim 1, wherein an additional clutch element facilitates separating the drive shaft (1) from a prime mover of the multiple stage transmission.

17. The multiple stage transmission according to claim 16, wherein the additional clutch element is one of a hydrodynamic converter, a hydraulic clutch, a dry starting clutch, a wet starting clutch, a magnetic powder clutch, or a centrifugal clutch.

18. The multiple stage transmission according to claim 17, wherein the drive shaft (1) is permanently connected with a crankshaft of the prime mover and an external starting element is provided in a power flow direction downstream of the multiple stage transmission.

19. The multiple stage transmission according to claim 1, wherein the drive shaft (1) is permanently connected with a crankshaft of a prime mover and a starting element of the transmission facilitates starting of the multiple stage transmission.

20. The multiple stage transmission according to claim 19, wherein the fourth clutch (56) is the shifting element for starting the multiple stage transmission.

21. The multiple stage transmission according to claim 1, wherein a torsional vibration damper is located between a prime mover and the multiple stage transmission.

22. The multiple stage transmission according to claim 1, wherein a wear-free brake is provided on each of the drive shaft, the driven shaft, the third shaft, the fourth shaft, the fifth shaft and the sixth shaft (1, 2, 3, 4, 5, 6) of the multiple stage transmission.

23. The multiple stage transmission according to claim 1, wherein a power take-off is provided upon at least one of the drive shaft, the driven shaft, the third shaft, the fourth shaft, the fifth shaft and the sixth shaft (1, 2, 3, 4, 5, 6) for driving an additional unit.

24. The multiple stage transmission according to claim 23, wherein the power take-off is provided upon one of the drive shaft (1) and the driven shaft (2).

25. The multiple stage transmission according to claim 1, wherein each shifting element is one of a power shifting clutch and a power shifting brake.

26. The multiple stage transmission according to claim 25, wherein each shifting element is one of a multi-disc clutch, a band brake and a tapered clutch.

27. The multiple stage transmission according to claim 1, wherein each shifting element is one of a form-locking brake and a form-locking clutch.

28. The multiple stage transmission according to claim 1, wherein an electric machine is mounted on at least one of the drive shaft, the driven shaft, the third shaft, the fourth shaft, the fifth shaft and the sixth shaft (1, 2, 3, 4, 5, 6) and functions as one of a generator and an additional prime mover.

29. The multiple stage transmission according to claim 1, wherein, when radially observed, at least one of the first and second clutches (13, 15) and the third and fourth clutches (46, 56) is situated approximately above the first, the second and the third planetary gear sets (P1, P2, P3).

* * * * *